(No Model.) 3 Sheets—Sheet 1.

H. FOSTER & A. BERESFORD.
VENTILATING, EXHAUSTING, OR BLOWING FAN.

No. 596,107. Patented Dec. 28, 1897.

Witnesses
J. Cosford
W. Shearwood

Inventors
H. Foster
A. Beresford
per H. F. Boughton
Attorney (No Model.) 3 Sheets—Sheet 2.

H. FOSTER & A. BERESFORD.
VENTILATING, EXHAUSTING, OR BLOWING FAN.

No. 596,107. Patented Dec. 28, 1897.

Witnesses
Y. Cosford
W. Shearwood

Inventors
H. Foster
A. Beresford
per H. F. Boughton
Attorney (No Model.) 3 Sheets—Sheet 3.
H. FOSTER & A. BERESFORD,
VENTILATING, EXHAUSTING, OR BLOWING FAN.
No. 596,107. Patented Dec. 28, 1897.
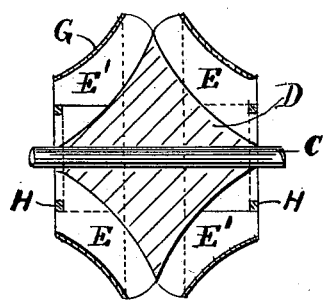
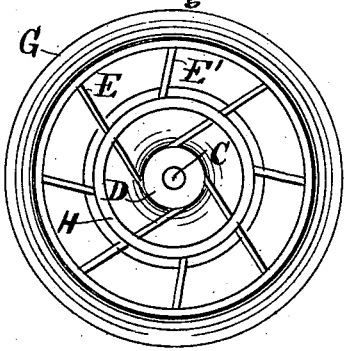
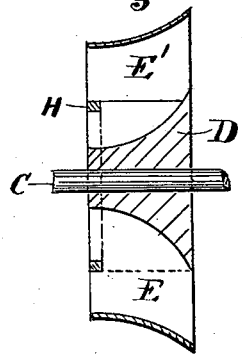
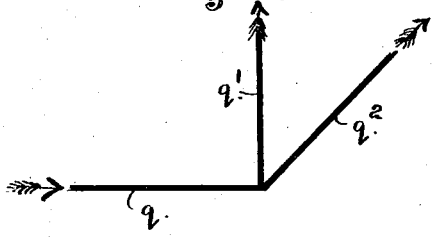
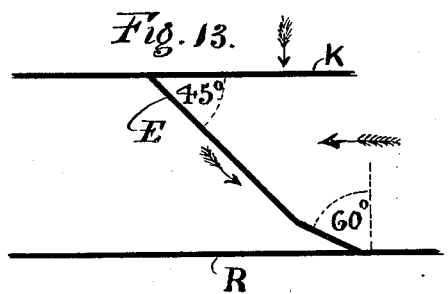

UNITED STATES PATENT OFFICE.

HARRY FOSTER AND AARON BERESFORD, OF ECKINGTON, ENGLAND; SAID BERESFORD ASSIGNOR TO FREDERICK HARDWICK, OF SAME PLACE.

VENTILATING, EXHAUSTING, OR BLOWING FAN.

SPECIFICATION forming part of Letters Patent No. 596,107, dated December 28, 1897.

Application filed March 19, 1897. Serial No. 628,343. (No model.) Patented in England July 7, 1896, No. 14,990.

*To all whom it may concern:*

Be it known that we, HARRY FOSTER and AARON BERESFORD, subjects of the Queen of Great Britain, and residents of 6 Market Street, Eckington, in the county of Derby, England, have invented certain new and useful Improvements in Ventilating, Exhausting, or Blowing Fans, (for which we have obtained a patent in Great Britain, No. 14,990, dated July 7, 1896,) of which the following is a full, clear, and exact specification thereof.

Our present invention relates to improvements in ventilating, blowing, or exhausting fans, the objects of the invention being to produce a fan for blowing, forcing, or exhausting air that shall transform what is known as the "perviating force" or "inlet-current" of air and also that force caused by centrifugal action into an outlet or delivery current with the least possible loss or expenditure of power and avoiding all churning action of the air during its induced or forced passage through said fan. We attain these objects by the mechanism or combination of parts illustrated in the accompanying drawings, in which—

Figure 1:
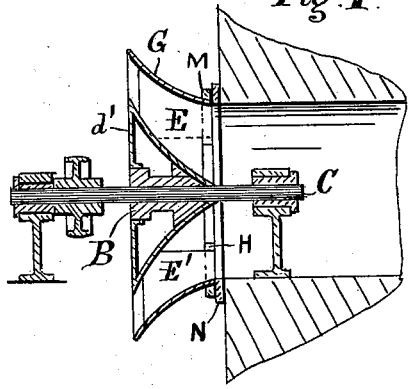
Figure 2:
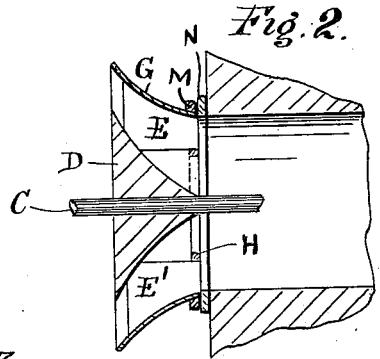
Figure 3:
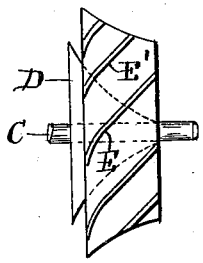
Figure 4:
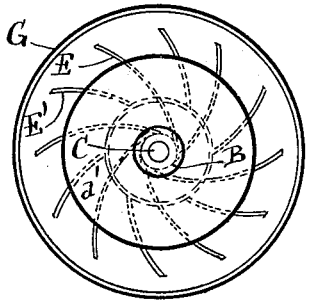
Figure 5:
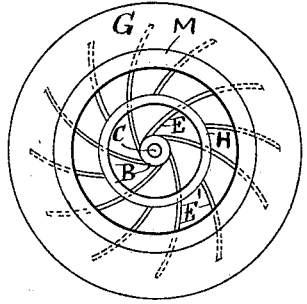
Figure 6:
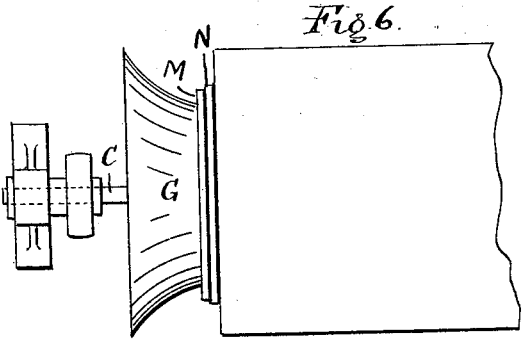
Figure 7:
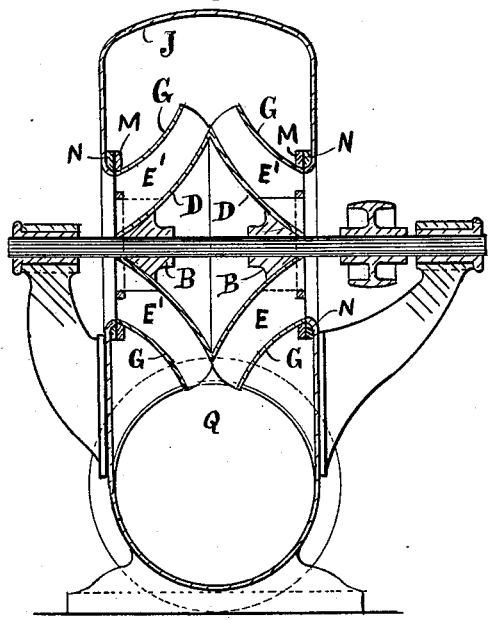
Figure 8:
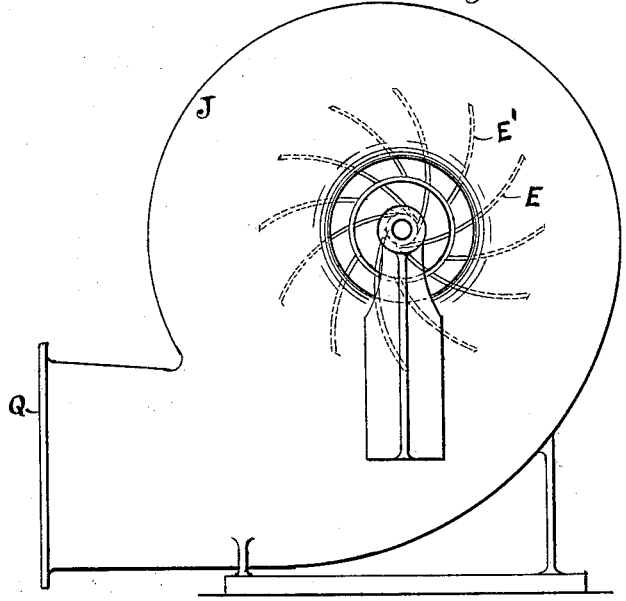

Figure 1 is a cross-sectional elevation of the entire fan shown in position for exhausting air from a shaft or coal-mine working, and Fig. 2 is a similar cross-sectional elevation of a modification of said fan with the spindle-bearings removed. Fig. 3 is a side view of fan with the outer casing removed. Fig. 4 is a back view or view looking toward the right of Figs. 1 and 2 with bearings removed. Fig. 5 is a front view or view looking toward the left of Figs. 1 and 2 with bearings removed, and Fig. 6 is a plan of our improved fan. Fig. 7 is a cross-sectional elevation of our improved fan. Fig. 8 is a side view of same;
and Fig. 9 is a cross-sectional elevation of a modification of the arrangement shown at Figs. 7 and 8. Fig. 10 is a front elevation, and Fig. 11 a cross-sectional elevation, of a further modification of our improved fan.
Fig. 12 is a diagram representative of the air-currents passing between the vanes of our improved fan, and Fig. 13 is a diagram showing the angles of the blades or vanes of our improved fan.
Similar letters refer to similar parts throughout the several views.

Referring to Figs. 1 to 6, we have illustrated a single-inlet coal mine or pit fan or ventilator.

In Fig. 1 a boss or hub B is fixed upon a working spindle or shaft C, and to said boss or hub B is secured a conical drum D, which acts as a foundation or base for the vanes or blades E and E'. The said conical drum D is closed at its larger end by a plate d', or the drum D and hub B may be made in one and solid, as shown at Fig. 2.

We would here remark that we are aware that deflecting-plates have been used in fans fixed above a hub and arranged between every two vanes or blades, but such an arrangement must not be confounded with our improved conical drum cone or frustum D, as the latter performs a different function, and is not employed for equalizing pressure in any way.

In our invention one series of vanes or blades E have their lower edges fixed to the curved surface of the conical drum D, and their upper edges are secured to and likewise support a conical or funnel-shaped outer rim or casing G, which, with the intermediate vanes or blades E and E', revolves with said drum D. About half-way between the shaft C and the rim or casing G and concentrically therewith we arrange an annular ring or similar support H, which is fixed to the front of vanes E, and to this, as well as the rim G and drum D, we fix lesser vanes or blades E'. The said vanes E and E' so held between the conical parts D and G are placed transversely, and at the inlet, where they catch the incoming air, the angle of the face of each vane E and E' with the shaft C is forty-five degrees for its entire radial length, and the angle of the delivery end is sixty degrees opposite to direction of rotation. (See diagram Fig. 13, where E represents the vane, K the inlet side of outer casing G, and R the outlet side of said casing G.)

Any desired number of vanes E and E' may be employed, and in single-exhaust fans we prefer to carry the delivery edges of the drum D and casing G beyond the delivery edges of the vanes E and E', as shown.

In the fan, Figs. 1 and 2, which is shown coupled up to a pit drift or shaft L, we employ two annular facings M and N, composed of wood and forming a ring-joint for the purpose of preventing any return of the exhausted air to the pit or drift L. The ring M is carried on the outer casing G and revolves with the fan, and the ring N is a fixture to the mouth of drift or pit L.

Referring to Figs. 7 and 8, we show the manner in which we apply our invention in the form of a double-inlet blowing or exhaust fan. In this arrangement we use a duplicate set of cones D and G, arranged, as before described, with the modification of the delivery edges of the cones D projecting laterally beyond the outer peripheral edges of the rims G. The wider ends or bases of the cones D meet each other centrally, so forming a double cone, as shown. The vanes E and E' in this construction of fan are carried forward and so form in cross-section a V-shaped delivery. The combined revolving parts G G, D D, E E, and H H are inclosed in an ordinary casing P, preferably of the well-known spiral form in side elevation and having inlets at each side around the working shaft or spindle C and an outlet Q. For ordinary ventilating the duplicate arrangement of our improved fan may be employed without the casing P and the cones D may be made solid and in one, as shown at Fig. 9.

Referring to Figs. 10 and 11, the modification consists of arranging the vanes or blades E and E' the full width of the rim G and drum D, which latter simply forms a conical boss, and arranging the vanes E and E' a little in advance of a direct radial line or in straight tangential lines.

In diagram shown at Fig. 12 the line $q$ represents the inlet-current or perviating force or induced draft, and the line $q'$ represents the centrifugal force due to the revolution of the fan, and the resulting direction of these combined currents is indicated by the line $q^2$, by which means our invention attains its objects.

What we claim as our invention, and desire to secure by Letters Patent, is—

1. The combination in a ventilating blowing or exhausting fan of an inner or central cone fixed to a working spindle and outer conical casing with an intermediate concentric ring and vanes of varying depths said blades or vanes being inclined at the entrance side to an angle of forty-five degrees and at the delivery side to an angle of sixty degrees, the exit-openings between said vanes being in a forward direction substantially as set forth.

2. In a fan for ventilating blowing or exhausting the combination of a double central cone carrying vanes or blades with a double conical outer casing having its delivery edges apart and supported by said vanes substantially as set forth.

In testimony that we claim the foregoing we have hereunto set our hands this 20th day of February, 1897.

HARRY FOSTER.
AARON BERESFORD.

Witnesses:
H. STANIFORTH,
HY. G. GOODEN.